US012181569B2

(12) United States Patent
Lewis et al.

(10) Patent No.: US 12,181,569 B2
(45) Date of Patent: Dec. 31, 2024

(54) SYSTEM AND METHOD FOR DETECTING DRONES

(71) Applicant: Vortezon, Inc., Washington, DC (US)

(72) Inventors: Peter T. Lewis, Washington, DC (US);
Robert E. Kelly, Washington, DC (US); Robert J. Corbitt, Jr., Washington, DC (US)

(73) Assignee: Vortezon, Inc., Washington, DC (US)

( * ) Notice: Subject to any disclaimer, the term of this patent is extended or adjusted under 35 U.S.C. 154(b) by 1062 days.

(21) Appl. No.: 17/073,388

(22) Filed: Oct. 18, 2020

(65) Prior Publication Data

US 2021/0116559 A1    Apr. 22, 2021

Related U.S. Application Data

(60) Provisional application No. 62/923,492, filed on Oct. 19, 2019.

(51) Int. Cl.
*G01S 13/87* (2006.01)
*B60L 8/00* (2006.01)
(Continued)

(52) U.S. Cl.
CPC .......... *G01S 13/878* (2013.01); *B60L 8/003* (2013.01); *B60L 8/006* (2013.01); *B60L 53/51* (2019.02);
(Continued)

(58) Field of Classification Search
CPC ...... G01S 13/878; G01S 7/003; G01S 13/886; B60L 53/51; B60L 8/003; B60L 8/006;
(Continued)

(56) References Cited

U.S. PATENT DOCUMENTS

| 240,622 A | * | 4/1881 | Sykes | ...................... G01S 7/003 |
| | | | | 246/106 |
| 8,380,367 B2 | * | 2/2013 | Schultz | .............. G01C 21/3826 |
| | | | | 701/16 |

(Continued)

FOREIGN PATENT DOCUMENTS

| EP | 2511888 A1 | * | 10/2012 | ........... G05D 1/0088 |
| EP | 2770826 B1 | * | 7/2017 | ........... A01M 29/00 |

(Continued)

OTHER PUBLICATIONS

A_5G_platform_for_Unmanned_Aerial_Monitoring_in_Rural_Areas_Design_and_Performance_Issues (Giuseppe Faraci, Angelo Raciti, Santi Rizzo, Giovanni Schembra, DIEEI—Universory of Catania, Catania, Italy; 2018 IEEE International conference on Network Softwarization—Technical Sessions) (Year: 2018).*

(Continued)

*Primary Examiner* — Nuzhat Pervin
(74) *Attorney, Agent, or Firm* — PENILLA IP, APC

(57) ABSTRACT

A drone detection system includes a plurality of base stations, which are distributed over a geographic area that includes a facility. Each base station is configured to emit radio signals that are monitored for reflection data, which is generated when the radio signals reflect from an object. A server is configured to process the reflection data to identify a drone in proximity to the facility. The processing is configured to process the reflection data over time to identify trajectory metrics for the identified drone. The trajectory metrics are configured to predict a path of the drone and determine if the drone constitutes a threat to the facility. An alert is processed by the server when the drone is determined to constitute a threat to the facility. A data center is configured to receive and store processed reflection data that has been processed by the server.

13 Claims, 11 Drawing Sheets

(51) Int. Cl.
  *B60L 53/51* (2019.01)
  *B64D 27/24* (2024.01)
  *B64D 27/353* (2024.01)
  *B64U 10/13* (2023.01)
  *B64U 50/19* (2023.01)
  *B64U 50/31* (2023.01)
  *B64U 50/34* (2023.01)
  *B64U 70/00* (2023.01)
  *B64U 101/60* (2023.01)
  *G01S 7/00* (2006.01)
  *G01S 13/88* (2006.01)
  *H04W 84/04* (2009.01)

(52) U.S. Cl.
  CPC .............. *B64D 27/24* (2013.01); *G01S 7/003* (2013.01); *G01S 13/886* (2013.01); *B60L 2200/10* (2013.01); *B64D 27/353* (2024.01); *B64D 2221/00* (2013.01); *B64U 10/13* (2023.01); *B64U 50/19* (2023.01); *B64U 50/31* (2023.01); *B64U 50/34* (2023.01); *B64U 70/00* (2023.01); *B64U 2101/60* (2023.01); *H04W 84/042* (2013.01)

(58) Field of Classification Search
  CPC ... B60L 2200/10; B64C 39/024; B64D 27/24; B64D 2211/00; B64D 2221/00; B64U 10/13; B64U 50/19; B64U 50/34; H04W 84/042
  USPC ......................................................... 342/59
  See application file for complete search history.

(56) References Cited

U.S. PATENT DOCUMENTS

| | | | | |
|---|---|---|---|---|
| 8,886,459 B2* | 11/2014 | Stefani | ................ | G08G 5/0069 701/487 |
| 9,880,256 B2* | 1/2018 | Baxley | .................... | H04B 1/18 |
| 9,933,780 B2* | 4/2018 | Chau | .................... | G05D 1/0011 |
| 9,948,380 B1* | 4/2018 | Vos | .................... | H04B 7/18506 |
| 10,009,063 B2* | 6/2018 | Gerszberg | ................ | H04B 3/52 |
| 10,389,432 B2* | 8/2019 | De Rosa | .............. | G08G 5/0039 |
| 10,586,464 B2* | 3/2020 | Dupray | ................ | G08G 5/0008 |
| 10,720,068 B2* | 7/2020 | Raptopoulos | ........ | G08G 5/0069 |
| 10,872,534 B2* | 12/2020 | Clark | .................... | B64U 30/20 |
| 10,950,118 B2* | 3/2021 | Brown | ................... | G06V 20/52 |
| 11,113,976 B2* | 9/2021 | Chambers | ............ | G08G 5/0039 |
| 11,258,625 B2* | 2/2022 | Decenzo | .............. | H04W 12/02 |
| 11,279,481 B2* | 3/2022 | Burks | ................. | B64C 29/0025 |
| 11,341,858 B2* | 5/2022 | Priest | ................... | G08G 5/0082 |
| 11,501,628 B2* | 11/2022 | Jedwab | ............ | G08B 13/19652 |
| 2016/0124071 A1* | 5/2016 | Baxley | ..................... | H04W 4/70 348/143 |
| 2016/0127931 A1* | 5/2016 | Baxley | ..................... | G06T 7/60 455/67.16 |
| 2016/0232777 A1* | 8/2016 | Jedwab | ............ | G08B 13/19652 |
| 2019/0347950 A1* | 11/2019 | Armstrong | ................. | F41J 5/08 |
| 2019/0364533 A1* | 11/2019 | Kleinbeck | ............. | H04W 24/02 |
| 2020/0003817 A1* | 1/2020 | Álvarez López | ...... | B64U 10/16 |
| 2020/0082731 A1* | 3/2020 | Choi | ..................... | G05D 1/106 |
| 2020/0120266 A1* | 4/2020 | Kleinbeck | .............. | G08B 25/10 |
| 2020/0122830 A1* | 4/2020 | Anderson | ............. | G05D 1/0866 |
| 2020/0189731 A1* | 6/2020 | Mistry | ................ | B64U 10/60 |
| 2020/0225684 A1* | 7/2020 | Anderson | ............. | B64U 70/95 |
| 2020/0266903 A1* | 8/2020 | De Rosa | ........... | H04B 7/18506 |
| 2020/0295855 A1* | 9/2020 | Kleinbeck | ............. | H04W 24/02 |
| 2020/0410872 A1* | 12/2020 | Speasl | ................ | G08G 5/0034 |
| 2021/0039807 A1* | 2/2021 | Michalski | ............... | B64U 50/37 |
| 2021/0084217 A1* | 3/2021 | Kleinbeck | .............. | H04N 23/60 |
| 2021/0302621 A1* | 9/2021 | Brown | .................... | H04Q 9/00 |
| 2022/0021442 A1* | 1/2022 | Kosseifi | ............ | H04B 7/18506 |
| 2023/0132171 A1* | 4/2023 | Jedwab | ............ | G08B 13/19608 340/541 |
| 2024/0103638 A1* | 3/2024 | Tran | ....................... | G06F 3/017 |

FOREIGN PATENT DOCUMENTS

| | | | | |
|---|---|---|---|---|
| EP | 3327609 A1 * | 5/2018 | .............. | G01S 5/02 |
| WO | WO-2019161076 A1 * | 8/2019 | ............. | G01R 29/08 |

OTHER PUBLICATIONS

Faraci et al. (A_5G_platform_for_Unmanned_Aerial_Monitoring_in_Rural_Areas_Design_and_Performance_Issues, 2018)(Year: 2018).*

* cited by examiner

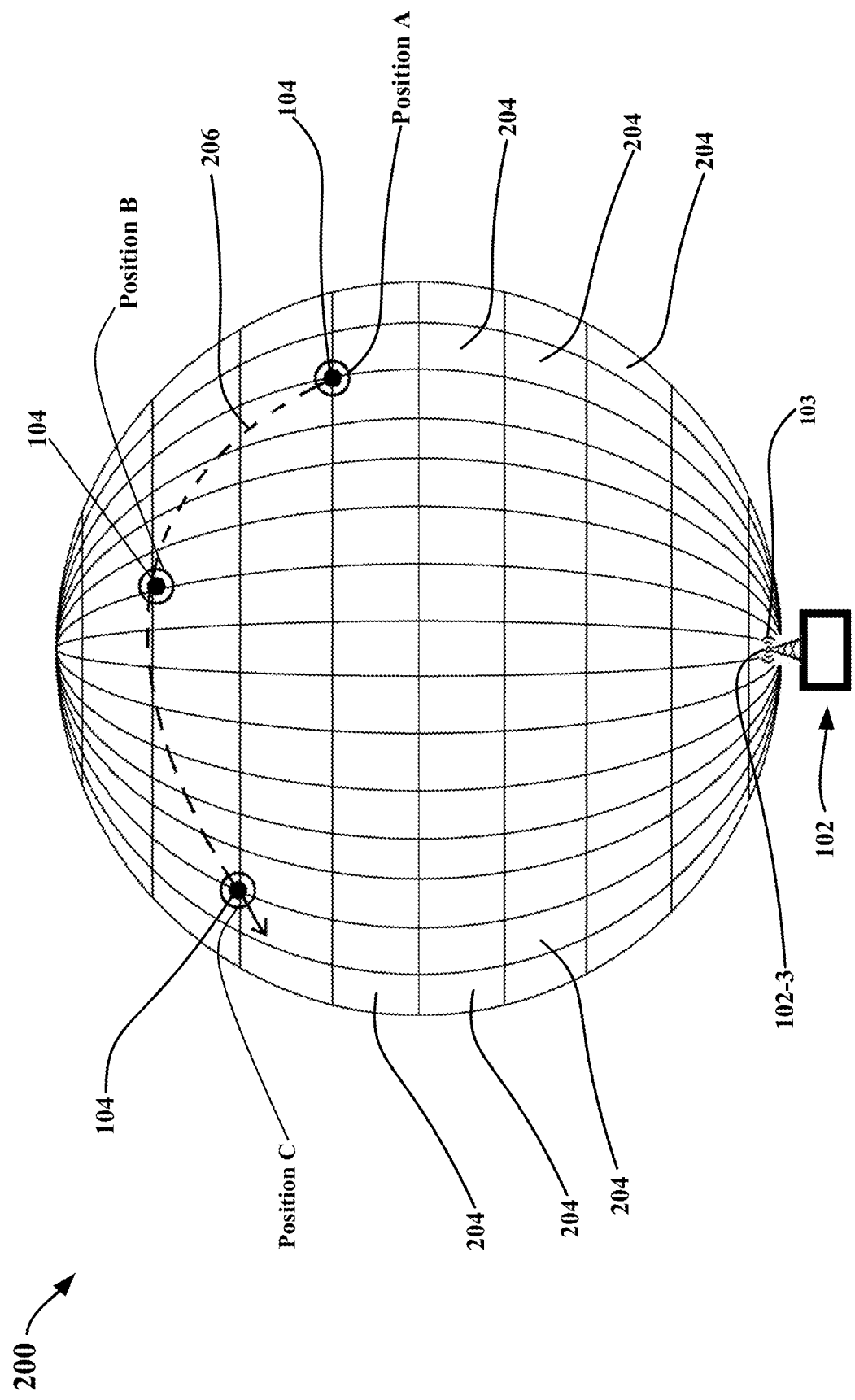

- Inspector Name: _____
- Date: _____ Month XX _____ Day YY _____ Year ZZZZ
- Address: _____

| Landing Area Inspection Item | Pass | Fail |
|---|---|---|
| Flatness (within 15° Horizontal) | | |
| Clear of Foliage | | |
| No High Grass / Grass Maintained | | |
| Clear of Overhead Lines (TV, Power) | | |
| Free of Ground Appurtenances | | |
| ≥ 10 Square Feet | | |
| Other A | | |
| Other B | | |

Fig. 3

SYSTEM AND METHOD FOR DETECTING DRONES

CLAIM FOR PRIORITY

This application claims priority to and the benefit of U.S. Provisional Application No. 62/923,492 filed on Oct. 19, 2019, the disclosure of which is incorporated by reference herein in its entirety for all purposes.

BACKGROUND

In recent years, the news media has reported several instances of unmanned aircraft system (UAS or drone) near misses with manned aircraft, especially close to airports, which has caused airports to shut down, and near wildfires, which has caused interference with manned aircraft working to extinguish quickly spreading flames. Detecting the presence of a UAS is a significant problem because UAS acoustic-based detection systems have inferior range and accuracy. Current UAS frequency-based detection systems normally assume that perpetrators flying drones in an unauthorized manner around airports and wildfires are using for telemetry control either 900 MHz, 2.4 GHz, or 5.2-5.8 GHz license-free spectrum that comes standard with many drone controllers. If, however, a UAS/drone operator wanted to conduct nefarious operations and not be detected by such UAS frequency-based detection systems, they could merely fly a drone on a frequency not authorized for drone telemetry, of which there are many. The foregoing tactic would preclude current acoustic-based detection systems from being effective. Consequently, a need exists for an effective drone detection system not based on acoustic detection.

In addition, the drone industry has a continuing problem regarding flight duration. Drone battery capacity is quite limited. As a result, drones can fly only for a short period of time before being required to recharge or terminate the flight. This is a significant technical problem that requires resolution as the federal regulatory scheme evolves to allowing for drones to fly beyond the visual line of sight of the pilots on the ground. Thus, increasing drone battery capacity to enable longer flight time would be beneficial to the entire drone industry.

It is in this context that embodiments arise.

SUMMARY

In an example embodiment, a drone detection system includes a plurality of base stations. Each of the plurality of base stations is distributed over a geographic area that includes a facility, and each of the plurality of base stations is configured to emit radio signals that are monitored for reflection data over the geographic area. The reflection data is generated when the radio signals reflect from an object. The drone detection system also includes a router in communication with the plurality of base stations and a server in communication with the router. The server is configured to process the reflection data to identify a drone in proximity to the facility, and the processing by the server is configured to process the reflection data over a period of time to identify trajectory metrics for the identified drone. The trajectory metrics are configured to predict a path of the drone and determine if the drone constitutes a threat to the facility within the geographic area. An alert is processed by the server when the drone is determined to constitute a threat to the facility. The drone detection system also includes a data center connected to the internet. The data center is configured to receive and store processed reflection data that has been processed by the server.

In one embodiment, the plurality of base stations is connected in a mesh network that allows the plurality of base stations to communicate with each other. In one embodiment, each of the plurality of base stations includes a transceiver, with the transceiver emitting radio signals and receiving reflected radio signals that have reflected from an object in the geographic area back to one of the plurality of base stations.

In one embodiment, the alert is sent to a predefined recipient associated with the facility. In one embodiment, the radio signals emitted by each base station define an individual grid sphere, and an overall combination of the individual grid spheres defined by each of the plurality of base stations defines a drone detection radio coverage area.

In another example embodiment, a method of detecting a drone in proximity to a facility includes receiving, by a plurality of base stations, reflection data resulting from radio signals emitted by the plurality of base stations, with the plurality of base stations being distributed over a geographic area that includes the facility. The method also includes receiving, by a server connected to the internet, the reflection data received by the plurality of base stations, and processing, by the server, the reflection data to identify a drone in proximity to the facility. The processing by the server is configured to process the reflection data over a period of time to identify trajectory metrics for the identified drone. The trajectory metrics are configured to predict a path of the drone and determine if the drone constitutes a threat to the facility within the geographic area. The method further includes processing, by the server, an alert to a predefined recipient when the drone is determined to constitute a threat to the facility.

In one embodiment, the processing, by the server, to determine if the drone constitutes a threat to the facility includes analyzing the reflection data in combination with position location data of the drone, with the position location data of the drone including the latitudinal, longitudinal, and altitudinal coordinates collected from the plurality of base stations.

In one embodiment, the alert conveys the presence of the drone and the real-time speed, location, and directional azimuth of the drone. In one embodiment, the method further includes storing, by a data center, processed reflection data that has been processed by the server.

In yet another example embodiment, a method for managing power for a drone includes activating a power distribution panel of the drone. The method also includes receiving, by the power distribution panel, a first power input comprised of direct current, with the first power input being activated responsive to a source of wind energy when the drone is placed in motion. The method further includes receiving, by the power distribution panel, a second power input comprised of direct current, with the second power input being activated responsive to a source of solar energy when a surface associated with the drone is exposed to light energy. Still further, the method includes combining, by the power distribution panel, the first power input comprised of direct current and the second power input comprised of direct current into a combined power input comprised of direct current, and feeding, by the power distribution panel, the combined power input comprised of direct current to a primary power source of the drone.

In one embodiment, the primary power source of the drone is a battery. In one embodiment, the power distribution panel feeds the combined power input comprised of direct current to the battery while the drone is in flight. In one embodiment, the source of wind energy is a wind turbine mounted on the drone and the source of solar energy is a solar panel mounted on the drone.

In a further example embodiment, a power distribution system includes a primary battery power source for providing power to a drone, and a power distribution panel interfaced with the primary battery power source. The power distribution system also includes a first power input and a second power input. The first power input includes a collector for receiving wind, and the collector is configured to direct wind toward a wind turbine to rotate rotors of the wind turbine for producing a first electric power. The first electric power is processed by a first voltage regulator, with the first voltage regulator providing a first charge to the primary battery power source via control of the power distribution panel. The second power input includes a solar panel for receiving light energy, and the light energy is converted to a second electric power. The second electric power is processed by a second voltage regulator, with the second voltage regulator providing a second charge to the primary battery power source via control of the power distribution panel.

In one embodiment, the power distribution panel is configured to combine the first charge provided by the first voltage regulator and the second charge provided by the second voltage regulator into a single combined charge and to feed the single combined charge to the primary battery power source.

In one embodiment, the first power input further includes a converter for converting wind energy to electric energy, and the second power input further includes a converter for converting solar energy to electric energy. In one embodiment, the first power input further includes a diode to prevent energy from flowing back to the wind turbine and causing back bias. In one embodiment, the second power input further includes a diode to prevent energy from flowing back to the solar panel and causing back bias. In one embodiment, the power distribution system is mounted on a drone.

Other aspects and advantages of the disclosures herein will become apparent from the following detailed description, taken in conjunction with the accompanying drawings, which illustrate by way of example the principles of the disclosures.

BRIEF DESCRIPTION OF THE DRAWINGS

FIG. 2 shows a schematic diagram of an ultra-wideband (UWB) grid sphere, in accordance with one embodiment.

FIG. 3 illustrates an unmanned aircraft system (UAS)/drone landing area qualifications checklist, in accordance with one embodiment.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Figure 1A:
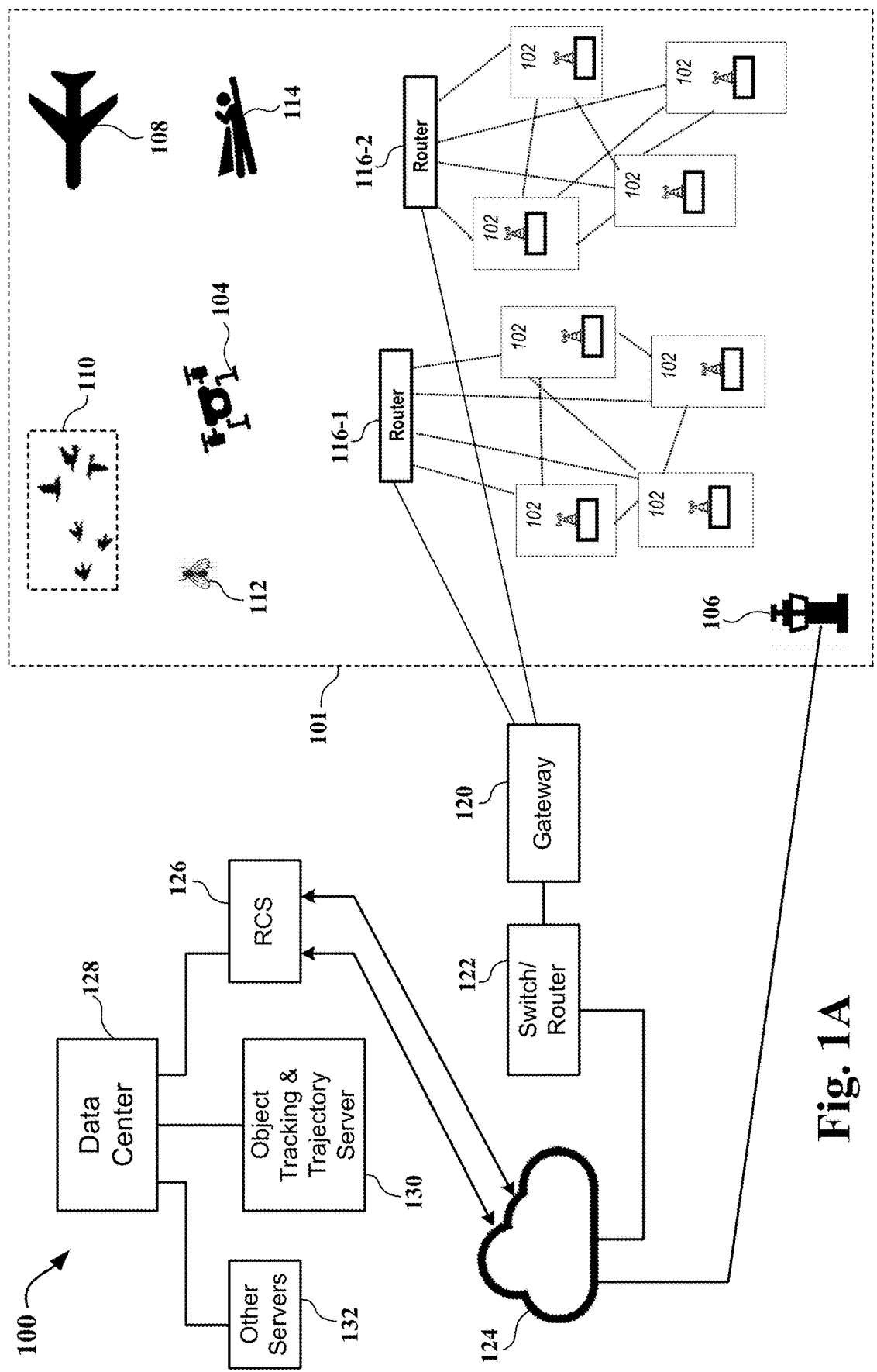
FIG. 1A shows a schematic diagram of an ultra-wideband (UWB) unmanned aircraft system (UAS or drone) detection system capable of determining with a high degree of accuracy the location of a UAS or drone within the coverage area of the UWB drone detection system, in accordance with one embodiment.

FIG. 1A shows a schematic diagram of an ultra-wideband (UWB) unmanned aircraft system (UAS or drone) detection system 100 ("UWB drone detection system 100") capable of determining with a high degree of accuracy the location of a UAS or drone 104 ("drone 104") within the coverage area of the UWB drone detection system, in accordance with one embodiment.

As shown in FIG. 1A, the UWB drone detection system 100 includes a plurality of base stations 102. In the example shown in FIG. 1A, the UWB drone detection system 100 includes eight base stations 102, with four base stations coupled in communication with a router 116-1 and four base stations coupled in communication with another router 116-2. The base stations 102 are arranged in a geographic area in which a facility to be protected is located. The base stations 102 are wirelessly connected in a mesh network for redundant communications support. It will be apparent to those skilled in the art that the number of base stations and the number of routers to which the base stations are coupled can be varied to meet the needs of particular applications.

Figure 1B:
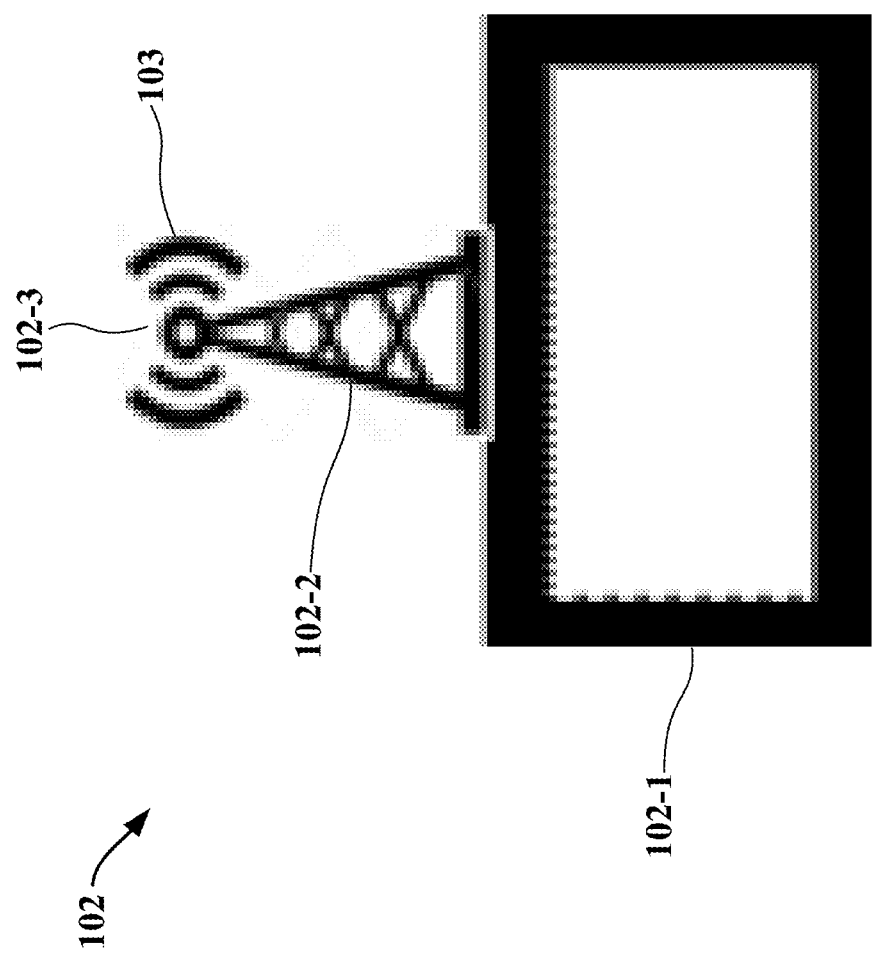
FIG. 1B shows additional details regarding each base station in the plurality of base stations, in accordance with one embodiment.

FIG. 1B shows additional details regarding each base station 102, in accordance with one embodiment. As shown in FIG. 1B, base station 102 includes a base support 102-1, an antenna structure/radio tower 102-2, and one or more RADAR transceiver antennas 102-3 located on the antenna structure/radio tower. In one embodiment, a RADAR transceiver antenna 102-3 transmits high resolution UWB RADAR radio signals 103 ("radio signals 103") and receives radio signals which have reflected back to the RADAR transceiver antenna, e.g., radio signals which have reflected from objects within the coverage area of the UWB drone detection system 100. In one embodiment, the RADAR transceiver antenna 102-3 operates on unlicensed frequencies in the 3-10 GHz range of FCC-regulated electromagnetic spectrum. The radio signal 103 generated by a transceiver antenna 102-3 of a base station 102 creates a single UWB radio coverage area, which is referred to herein as a "UWB grid sphere" (see FIG. 2 for additional details regarding the UWB grid sphere). As such, the plurality of base stations 102 creates a plurality of UWB grid spheres.

The UWB drone detection system radio coverage area 101, which is indicated in FIG. 1 by a dashed line in the shape of a rectangle, is defined by the overall combination of radio signals 103 of each of the plurality of UWB grid spheres.

With continuing reference to FIG. 1A, intruding objects that can pass into and/or through the UWB drone detection system radio coverage area 101 of the UWB drone detection system 100 include, by way of example, a large-scale airplane 108 either in the air or taxiing on the ground, a flock of birds or other flying animals 110, other non-mechanical flying objects of different sizes, e.g., insects 112 and humans 114 engaging in activities such as parachuting or flying with a jetpack, and drones 104. These intruding objects are variables which, when contacted by a radio signal 103 in the UWB drone detection system radio coverage area 101, will reflect the radio signal 103 back to a RADAR transceiver antenna 102-3 of a base station 102. In one embodiment, the radio signals 103 are transmitted and reflected at refresh rates of approximately 1 millisecond or more frequently.

Once the reflected radio signals 103 are collected by the respective RADAR transceiver antennas 102-3 of each of the base stations 102, the reflected radio signals are then transmitted from each base station through a router, e.g., routers 116-1 and 116-2, through the gateway 120, through the switch/router 122, and through to the cloud 124. The reflected radio signals 103 are routed from the cloud 124 to server 126 which is configured to execute UWB radar cross section (RCS) software for near-real time centimeter wave resolution analysis of the data in the reflected radio signals 103. As will be explained in more detail below, the RCS analysis is focused on the conductivity mass size combined with potential payload capability of intruding objects, e.g., objects 108, 110, 112, 114, and 104, entering into or passing through the UWB drone detection system radio coverage area 101 of UWB drone detection system 100.

In one embodiment, the near-real time centimeter wave resolution analysis carried out by the server 126 executing the RCS software determines whether or not the intruding object presently located in the UWB drone detection radio coverage area 101 of the UWB drone detection system 100 is a drone 104. If the analysis carried out by the server 126 executing the RCS software determines that the intruding object is a drone 104, then the server executing the RCS software next determines whether the intruding object is a threat to a facility 106 located within the radio coverage area of the drone detection system. In one embodiment, this determination is effected by analyzing data from the reflected radio signal 103 which is combined, using a simple mathematic mean, with position location data of the drone 104, including the latitudinal (x), longitudinal (y) and altitudinal (z) coordinates (see reference numbers 208, 210, and 212 in FIG. 2) collected from the plurality of base stations 102. In one embodiment, the RCS software includes a prioritization algorithm and this prioritization algorithm is used to process the data to determine the tracking and logical trajectory (see reference number 206 in FIG. 2) of the active drone 104. If it is determined that a threat to a facility 106 exists, then the server 126 executing the RCS software generates an alert, which is communicated to the facility through the cloud 124. In one embodiment, the alert conveys the presence and real-time speed, location, and directional azimuth of the intruding and threatening drone 104 with relative priority based on the potentially destructive nature of the drone.

With continuing reference to FIG. 1A, in one embodiment, the radio signals 103 communicated through the cloud 124 to the server 126 executing the RCS software for analysis are transmitted to data center 128 for storage and further possible action. In addition, any alert message generated as the result of the analysis carried out by the RCS software and sent through the cloud 124 to potentially-affected facilities 106 is also sent to the data center 128 and then stored in other servers 132. The object tracking and trajectory server 130 provides analytical and computational support for the near-real time centimeter wave resolution analysis of reflected radio signals 103 carried out by the server 126 executing the RCS software.

FIG. 2 shows a schematic diagram of an ultra-wideband (UWB) grid sphere 200, in accordance with one embodiment. The UWB grid sphere 200 is the UWB radio coverage area created by radio signals from a single base station, e.g., the radio signals 103 transmitted from one of the plurality of base stations 102 in the topology of base stations shown in FIG. 1.

As shown in FIG. 2, the UWB grid sphere 200 is made up of a plurality of individual grids 204. In one embodiment, the plurality of individual grids 204 is defined in the airspace around base station 102 by the radio signals 103 transmitted from the RADAR transceiver antenna 102-3 of the base station. In the example illustrated in FIG. 2, drone 104 has entered into UWB grid sphere 200 and is moving within the UWB grid sphere along path 206, which is indicated in FIG. 2 by a dashed line. As the drone 104 moves within the UWB grid sphere 200, the drone follows a trajectory that defines the path 206 which passes through Position A, Position B, and Position C. The trajectory of the path 206 along which the drone 104 moves within UWB grid sphere 200 is determined by collecting the radio signals 103 that have reflected from the drone back to the RADAR transceiver antenna 102-3 of the particular base station 102.

As described above with reference to FIG. 1A, the RCS software (see, e.g., server 126 shown in FIG. 1A) uses position location data of the intruding object, e.g., drone 104, as part of the determination whether the intruding object is a threat to a facility located within the UWB radio coverage area of the drone detection system. To this end, the position location data of the drone 104 is communicated through the cloud to the RCS software. In the example shown in FIG. 2, drone 104 moves along path 206 which passes through Position A, Position B, and Position C. The longitudinal (x), latitudinal (y), and altitudinal (z) coordinates of Positions A-C are (x-A, y-A, z-A), (x-B, y-B, z-B), and (x-C, y-C, z-C), respectively. These (x, y, z) coordinates, together with additional coordinates along path 206, are transmitted to the RCS software for use in making the determination as to whether the intruding object, e.g., the drone, is a threat to the facility.

In the example of FIG. 2, the intruding object is a drone 104. It will be apparent to those skilled in the art that the movement of other intruding objects, e.g., intruding objects 108, 110, 112, and 114 shown in FIG. 1A, within UWB grid sphere 200 can be determined in the same manner described for a drone, namely collecting the radio signals that have reflected from the intruding object back the RADAR transceiver antenna 102-3 of the particular base station 102.

As described above, radar cross-section (RCS) analysis software is used to determine whether or not an intruding object is a drone. In one embodiment, near-real time centimeter wave resolution analysis is carried out by the RCS software, e.g., server 126 executing the RCS software (see FIG. 1A), to determine whether or not the intruding object presently located in the UWB drone detection radio coverage area of the UWB drone detection system is a drone. One part of this analysis focuses on the mass size of the intruding objects, which can be measured by analyzing the radio signals reflected back from the intruding object.

In one embodiment, the RCS software performs an operation in which the mass size of the intruding object, as measured by analyzing the radio signals reflected back from the intruding object, is compared with an assigned range of reflectivity index values that indicate the nature of the intruding object. In one embodiment, if the mass size of the intruding object corresponds to a reflectivity index within the range from 0.00001 to 0.00002 m2, then the intruding object is considered to be an insect. In one embodiment, if the mass size of the intruding object corresponds to a reflectivity index within the range from 0.01 to 0.02 m2, then the intruding object is considered to be bird. In one embodiment, if the mass size of the intruding object corresponds to a reflectivity index within the range from 0.02 to 0.03 m2, then the intruding object is considered to be a UAS or drone. In one embodiment, if the mass size of the intruding object corresponds to a reflectivity index within the range from 1.0 to 1.2 m2, then the intruding object is considered to be a human. In one embodiment, if the mass size of the intruding object corresponds to a reflectivity index within the range from 2.0 to 3.5 m2, then the intruding object is considered to be a Learjet or a MD 500D helicopter. In one embodiment, if the mass size of the intruding object corresponds to a reflectivity index within the range from 90.0 to 110.0 m2, then the intruding object is considered to be a Boeing 757 airliner.

Thus, in the event the mass size of the intruding object is determined to correspond to a reflectivity index within the range from 0.02 to 0.03 m2, then the intruding object is considered to be a drone and the procedures associated with a drone detection event are initiated. In one embodiment, as described above with reference FIG. 1A, the server 126 executing the RCS software determines whether the drone is a threat to a facility within the radio coverage area of the drone detection system. In the event it is determined that a threat to the facility exists, then the RCS software generates an alert which is communicated to the facility. As described above, the alert can convey the presence and real-time speed, location, and directional azimuth of the intruding and threatening drone. Further, if necessary, the alert can also be sent to manned aircraft that are factors in the national airspace system (NAS) affected by the drone detection event.

FIG. 3 illustrates an unmanned aircraft system (UAS)/drone landing area qualifications checklist 300 ("drone landing area checklist"), in accordance with one embodiment. The drone landing area checklist is used to ensure that proposed landing areas are suitable for use with UAS/drones ("drones"). In one embodiment, the information inserted in the drone landing area checklist 300 is included in a drone landing area checklist database. In one embodiment, the drone landing area checklist database is part of the UWB drone detection system 100 shown in FIG. 1A. In this embodiment, the drone landing area checklist database can be stored on a suitable server, e.g., one of the servers that makes up the "other servers 132" shown in FIG. 1A.

As shown in FIG. 3, the drone landing area checklist 300 includes an administrative section 302. In the administrative section, a landing area inspector can input required administrative information including, by way of example, her name, the date, and the address (or other information identifying the location) of the proposed landing area. In one embodiment, the checklist is implemented in the form of a graphical user interface (GUI) that enables the information to be input into a suitable computing device, e.g., a tablet, a smartphone, etc.

The drone landing area checklist 300 further includes three columns 304, 306, and 308. Column 304, which is provided with the heading "Landing Area Inspection Item," lists the items to be considered during the inspection of the proposed drone landing area. Column 306, which is provided with the heading "Pass," is used to indicate that the corresponding inspection item is satisfied. Column 308, which is provided with the heading "Fail," is used to indicate that the corresponding inspection item is not satisfied.

In one embodiment, one inspection item listed in column 304 is "Flatness (within 15° Horizontal)," which refers to the flatness of the ground in the proposed landing area. If the inspection determines that the proposed landing area satisfies the flatness requirement, then the inspector can put a check mark or other suitable input in "Pass" column 306. If the inspection determines that the proposed landing area does not satisfy the flatness requirement, then the inspector can put a check mark or other suitable input in "Fail" column 308.

In one embodiment, another inspection item listed in column 304 is "Clear of Foliage," which refers to a lack of foliage that could interfere with the landing of the drone. Depending upon the result of the inspection, the inspector puts a check mark or other suitable input in either "Pass" column 306 or "Fail" column 308. In one embodiment, another inspection item listed in column 304 is "No High Grass/Grass Maintained," which refers to the state of any grassy area in the proposed landing area. Depending upon the result of the inspection, the inspector puts a check mark or other suitable input in either "Pass" column 306 or "Fail" column 308.

In other embodiments, additional inspection items listed in column 304 include a) "Clear of Overhead Lines (TV, Power)," b) "Free of Ground Appurtenances," and c) "≥10 Square Feet." Inspection item a) refers to the proposed landing area being clear of any overhead lines that could interfere with a drone landing. Inspection item b) refers to the proposed landing area being free of any fixtures or other items on the ground that could interfere with a drone landing. Inspection item c) refers to the size of the proposed landing area. For each of items a), b), and c), the inspector can put a check mark or other suitable input in either "Pass" column 306 or "Fail" column 308, depending upon the result of the inspection.

In the example of FIG. 3, column 304 also includes inspection items "Other A" and "Other B." The inspector can use these items to input additional inspection items beyond those expressly listed in column 304.

Once the drone landing area checklist 300 has been completed, the information included therein establishes whether a proposed landing area is suitable for use to land drones.

Figure 4:
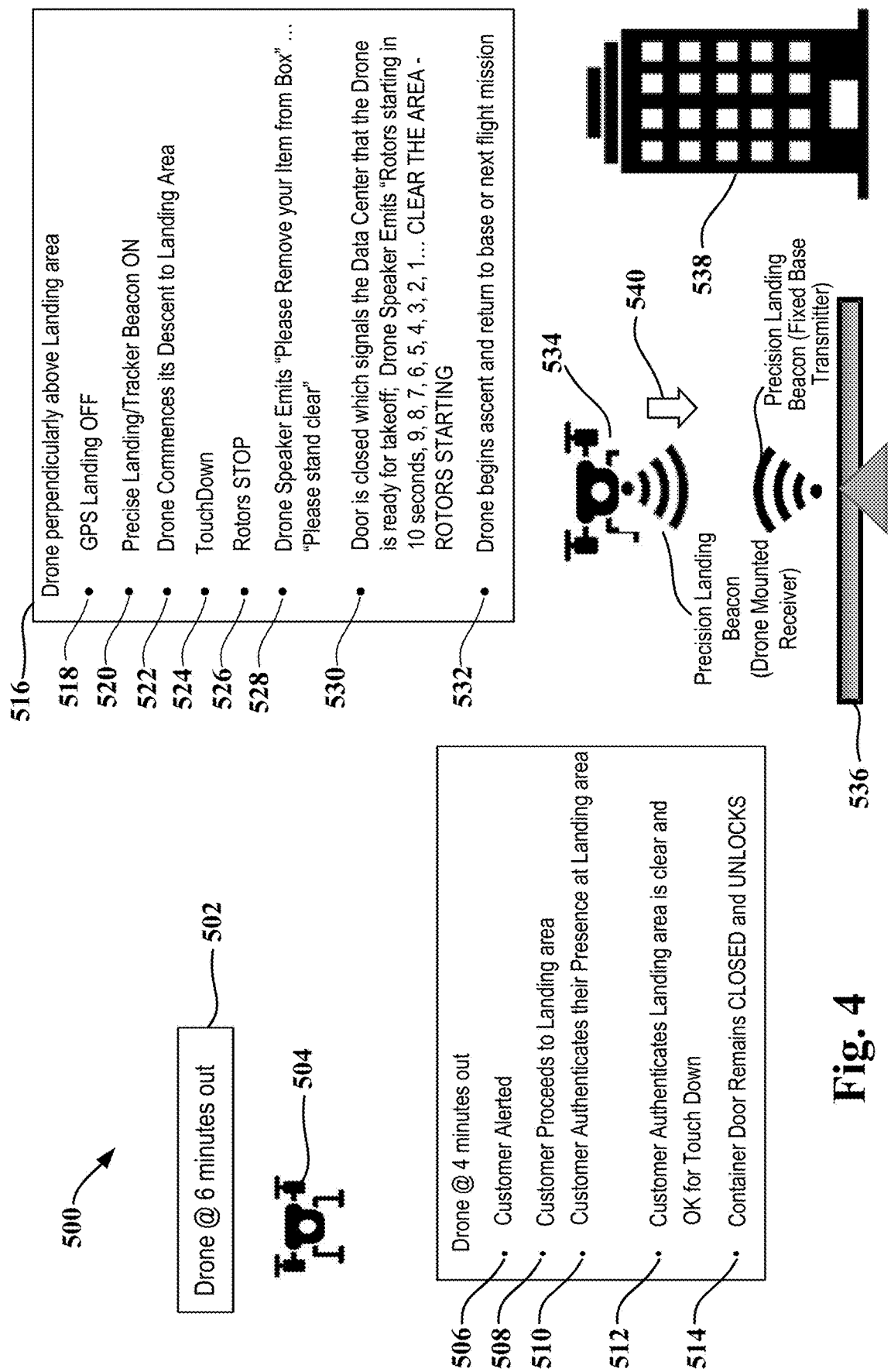
FIG. 4 is a functional diagram that shows a precision beacon approach landing area system, in accordance with one embodiment.

FIG. 4 is a functional diagram that shows a precision beacon approach landing area system 500 ("BALAS system 500"), in accordance with one embodiment.

As shown in FIG. 4, a delivery drone 504 with a payload, e.g., goods, is airborne and, as indicated at 502, is six minutes away from the designated landing area 536. In one embodiment, the landing area 536 is an area on a rooftop of a building 538. In one embodiment, the relative location of the delivery drone 504 is determined by the ultra-wide band (UWB) radar cross section (RCS) software (see server 126 shown in FIG. 1A), which carries out near-real time centimeter wave resolution analysis.

With continuing reference to FIG. 4, as the delivery drone 504 approaches a location four minutes away from the designated landing area 536, the BALAS system 500 is initiated. The BALAS system 500 transmits a BALAS system alert 506 to the delivery customer informing the customer of the proximity of the approaching delivery drone 504. In one embodiment, the alert 506 is transmitted from a data center, e.g., data center 128 shown in FIG. 1A, via the cloud 124. As indicated at 508, the delivery customer proceeds to the designated landing area 536. At 510, the customer authenticates his or her presence at the designated landing area 536 by responding to the alert 506. In the event the delivery customer fails to authenticate his or her presence at the designated landing area 536 within a designated period of time after receiving the alert 506, a command is automatically transmitted to the delivery drone 504. In one embodiment, the command instructs the delivery drone 504 to return to its origination point and terminate the delivery of the payload, e.g., goods. In one embodiment, the command is transmitted from the data center, e.g., data center 128 shown in FIG. 1A.

As indicated at 512, the delivery customer authenticates that the landing area 536 is clear and confirms that it is okay for the delivery drone 504 to touch down at the landing area. Once the delivery customer authenticates that the landing area is clear, at 514, the BALAS system 500 transmits a signal to the delivery drone 504 that causes the door of the on-board container in which the payload, e.g., goods, are being transported to be unlocked while the door remains closed. In one embodiment, a data center, e.g., the data center shown in FIG. 1A, transmits this signal to the delivery drone 504. Additional details regarding a UAS-mounted goods delivery container suitable for use in connection with BALAS system 500 are set forth below with reference to FIG. 5.

With continuing reference to FIG. 4, the final phase 516 of a landing using the BALAS system 500 occurs when the delivery drone 504 maneuvers into a position 534 that is perpendicular to the designated landing area 536. At this point, as indicated at 518, the BALAS system 500 turns off its GPS landing function. At approximately the same time, as indicated at 520, the BALAS system 500 turns on its precise landing/tracker beacon. Next, as indicated at 522, the delivery drone 504 commences its descent to the designated landing area 536. During the descent, the delivery drone 504 follows the electronic command of the precise landing/tracker beacon. In one embodiment, a receiver mounted on the delivery drone 504 receives the precise landing/tracker beacon transmitted from a fixed base transmitter located in the designated landing area 536. The delivery drone 504 then descends in the direction indicated by arrow 540 toward the designated landing area 536 and, as indicated at 524, touches down at the landing area. Once the delivery drone has touched down, the BALAS system 500 transmits a command for the delivery drone's rotors to stop, as indicated at 526. Next, as indicated at 528, the BALAS system 500 transmits a signal to the delivery drone 504 that causes the delivery drone to emit an audible safety warning message to the delivery customer and anyone else in the vicinity of the designated landing area 536. In one embodiment, the safety warning message is emitted by a speaker mounted on the delivery drone 504. In one embodiment, the safety warning message includes "Please stand clear" and "Please remove your item from the box."

To remove the goods from the delivery drone 504, the delivery customer opens the unlocked door of the on-board container and removes the goods from the container. After removing the goods, the delivery customer closes the door of the on-board container. As indicated at 530, the closing of the door of the on-board container causes a signal to be transmitted to the BALAS system 500 indicating that the delivery drone 504 has completed the delivery and is ready to take off from the landing area 536. In one embodiment, this signal is transmitted to a data center, e.g., data center 128 shown in FIG. 1. As also indicated at 530, the take-off procedure starts with the delivery drone 504 emitting an audible safety warning message advising those in the vicinity that take off is imminent. In one embodiment, the safety warning message includes a countdown regarding when the rotors will start, e.g., "Rotors starting in 10 seconds, 9, 8, 7, 6, 5, 4, 3, 2, 1, Clear the Area, Rotors Starting." Thereafter, once the rotors have started, at 532, the delivery drone 504 begins its ascent and either returns to base or begins another flight mission.

Figure 5:
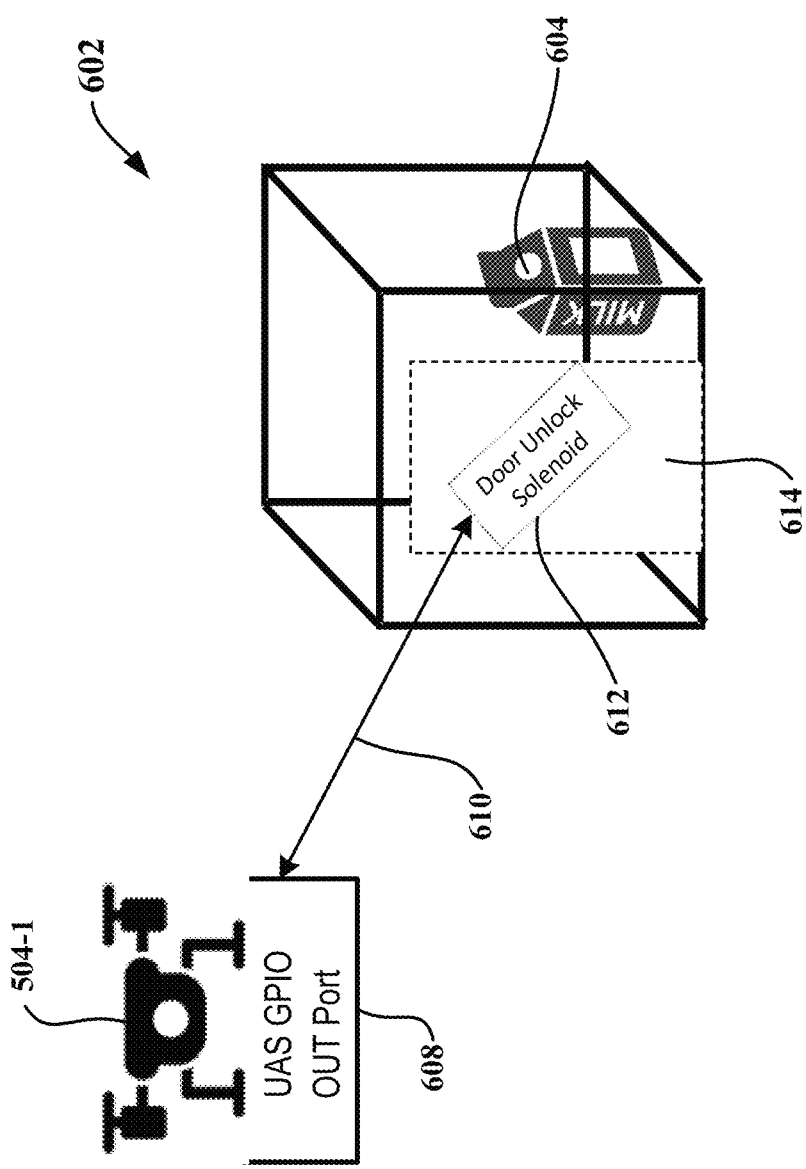
FIG. 5 shows a goods delivery container with an authentication-actuated lock system suitable for use with a delivery drone, in accordance with one embodiment.

FIG. 5 shows a goods delivery container with an authentication-actuated lock system suitable for use with a delivery drone, in accordance with one embodiment. As shown in FIG. 5, goods delivery container 602 has a generally cubic configuration. It will be apparent to those skilled in the art that the configuration of the goods delivery container 602 can be varied to allow for the delivery of goods having different shapes and sizes. The goods delivery container 602 has a door 614 formed in one side of the container. Goods 604 to be delivered can be placed in the interior of the goods delivery container 602 when the door 614 is open. In the example of FIG. 5, goods 604 is shown as a carton of milk; however, it will be apparent to those skilled in the art that the goods may be any item suitable for delivery.

In use, goods delivery container 602 is attached to delivery drone 504-1. In one embodiment, the goods delivery container 602 is attached to the underside of the delivery drone 504-1 so that the container is situated in the open space defined between the legs of the delivery drone. As shown in FIG. 5, goods delivery container 602 and delivery drone 504-1 are shown separate from one another, to make it easier to illustrate the operation of the authentication-actuated lock system that controls the operation of the door 614.

With continuing reference to FIG. 5, door 614 is provided with door-unlock solenoid 612. In one embodiment, the door-unlock solenoid 612 is embedded within the door 614. The delivery drone 504-1 is provided with a UAS general purpose input/output (GPIO) out port 608 ("GPIO out port 608"), through which radio signals 610 are transmitted from the delivery drone to the goods delivery container 602 to unlock the door 614 of the container. The GPIO out port 608 can be attached to the delivery drone 504-1 at any suitable location.

In one embodiment, the delivery drone 504-1 equipped with the GPIO out port 608 and the goods delivery container 602 is used in a controlled delivery system, e.g., the BALAS system shown in FIG. 4. Once the delivery customer has authenticated that the landing area is clear and that it is okay for the delivery drone to touch down at the landing area (see reference number 512 shown in FIG. 4), a signal will be transmitted to the delivery drone 504-1 to activate the authentication-actuated lock system. Thereafter, GPIO out port 608 will transmit a radio signal to the door-unlock solenoid 612 in the door 614 of the goods delivery container 602. In response to the radio signal, the door-unlock solenoid 612 unlocks the door 614. Once the delivery drone 504-1 has landed at the designated landing area, the delivery customer can open the unlocked door 614 and remove the goods 604 from the goods delivery container 602 through the door opening. After removing the goods 604 from the goods delivery container 602, the delivery customer will shut the door 614. The closing of the door 614 causes a signal to be transmitted to the BALAS system (see reference number 530) indicating that the delivery drone 504-1 has completed the delivery and is ready to take off from the landing area. In one embodiment, a door-mounted micro switch automatically causes a signal 610 to be transmitted to the BALAS system when the door 614 is closed.

Figure 6:
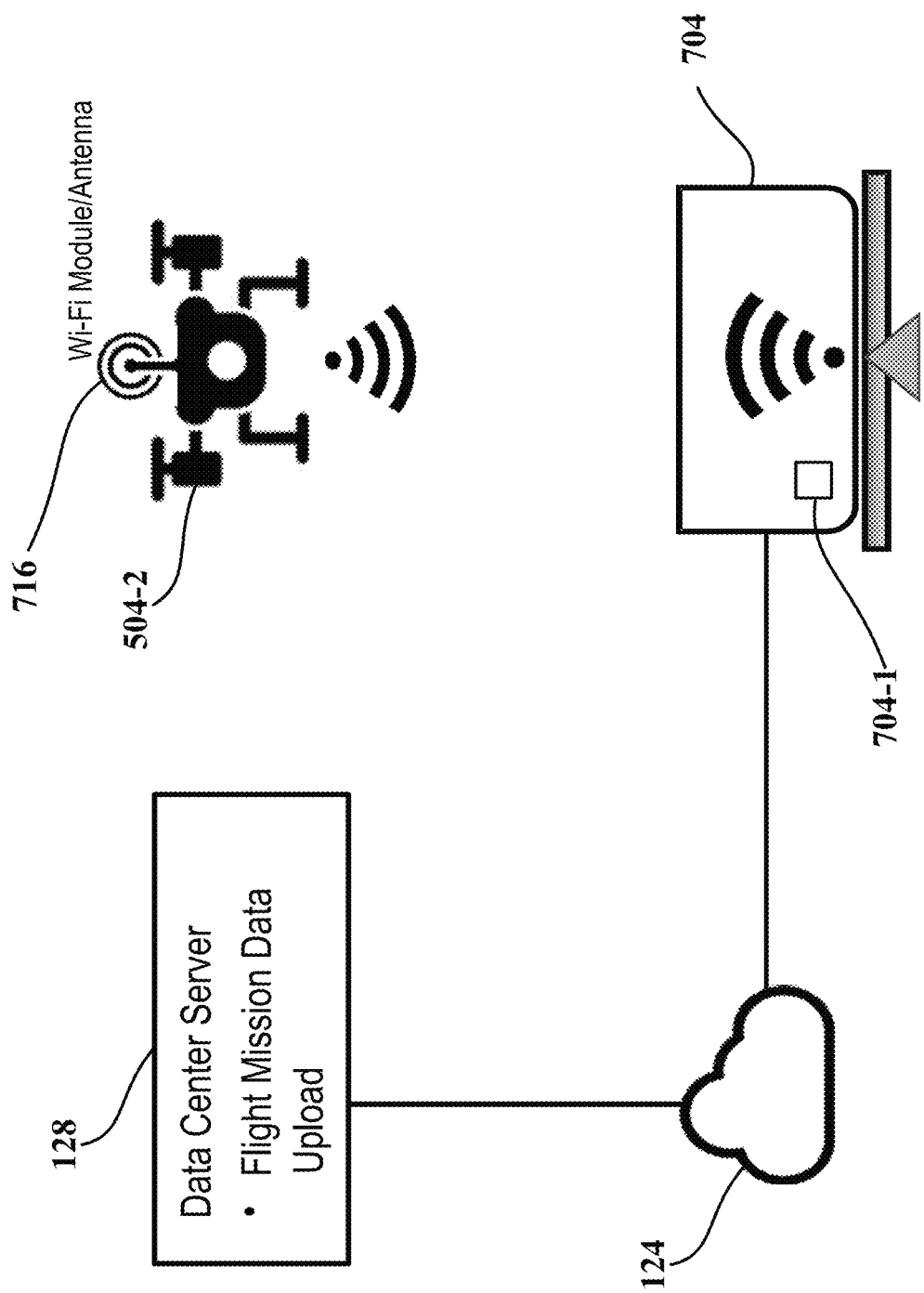
FIG. 6 is a schematic diagram that illustrates a smart UAS docking station, in accordance with one embodiment.

FIG. 6 is a schematic diagram that illustrates a smart UAS docking station 704 ("UAS docking station 704"), in accordance with one embodiment. As shown in FIG. 6, a drone 504-2 in flight is approaching the UAS docking station 704. In one embodiment, the UAS docking station 704 is part of a controlled delivery system, e.g., the BALAS system shown in FIG. 4. In one embodiment, the UAS docking station 704 is locating in the landing area of the BALAS system (see reference number 536 shown in FIG. 4). The drone 504-2 includes a connected area network bus ("CANbus") (not shown) configured for reporting maintenance diagnostics and fault codes.

In one embodiment, the UAS docking station 704 includes a direct current ("DC") charger 704-1. As such, when the drone 504-2 is docked in the UAS docking station 704, the drone can recharge its battery. In one embodiment, the drone 504-2 and the UAS docking station 704 include reciprocal interconnecting connectors, e.g., male/female connectors, to enable the drone to be plugged into the docking station for recharging.

The UAS docking station 704 is connected to the cloud 124 to enable data transmission. In one embodiment, the UAS docking station 704 is hard-wired to the cloud. In another embodiment, the drone 504-2 is provided with a WiFi module/antenna 716 and the UAS docking station 704 connects to the cloud 124 through the WiFi module/antenna on the drone. In particular, the WiFi module/antenna 716 on the drone 504-2 allows the drone to connect to a proximate WiFi access point to obtain wireless local area network (WLAN) connectivity.

In one embodiment, the drone 504-2 communicates with data center 128 (see FIG. 1A) through the cloud 124 to either upload to or download data from the data center. By way of example, the data uploads and downloads can include mission data, drone health/fault reports, data concerning the drone's operational status including operational problems obtained through the CANbus of the drone, and FAA-related flight alerts, including local UAS service supplier (LUN) flight termination notifications. As is well known by those skilled in the art, the UAS service supplier (USS) is, in essence, the digital equivalent of an air traffic controller for drones.

In addition, providing the drone 504-2 with internet connectivity allows the drone to integrate as a device on the internet and fully leverage the Internet of Things (IoT) communication connectivity protocols for, e.g., event triggering, event notification, and event correction.

Figure 7A:
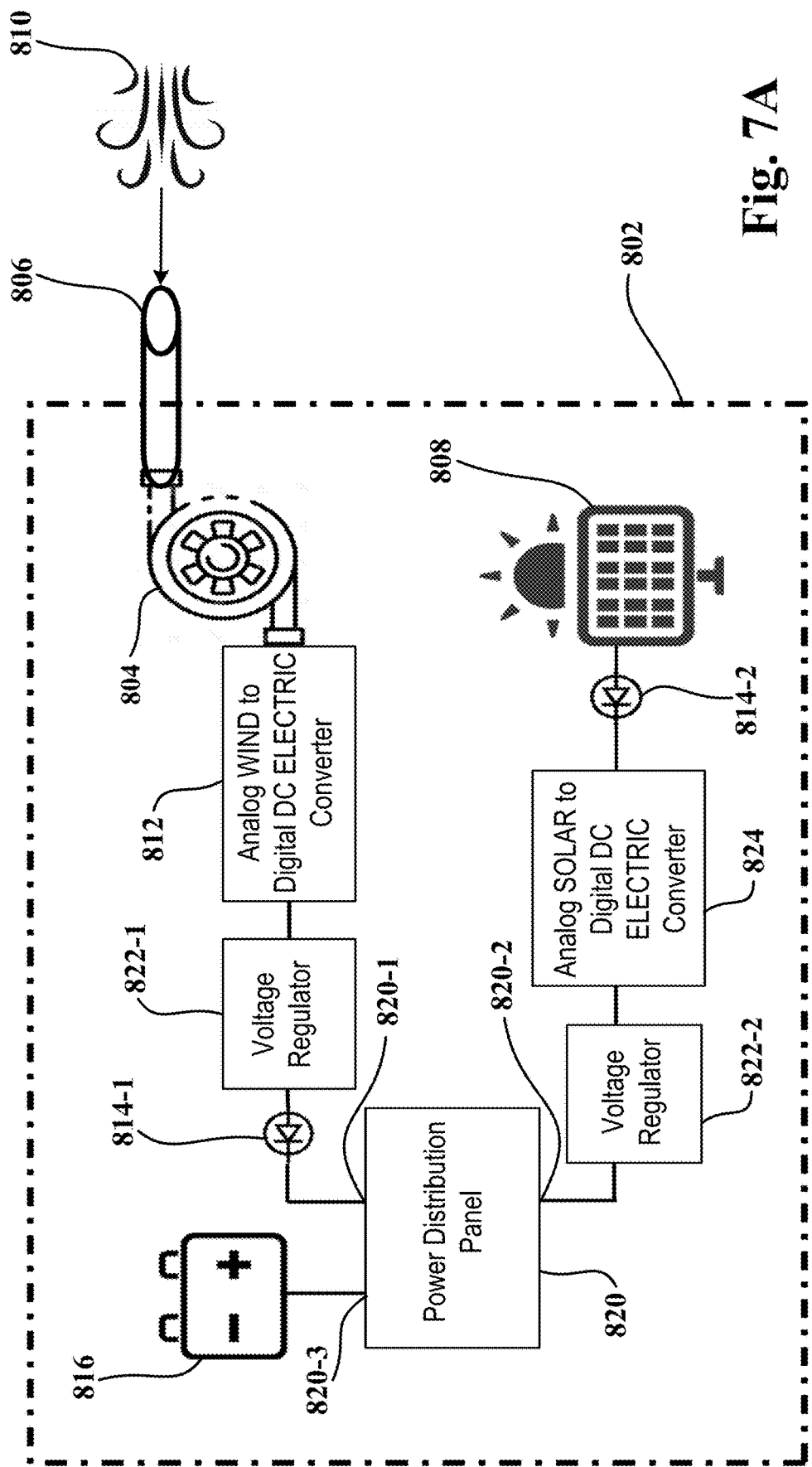
FIG. 7A is a schematic diagram that illustrates an in-flight power generation, distribution, and storage system for an unmanned aircraft system (UAS or drone), in accordance with one embodiment.
Figure 7B:
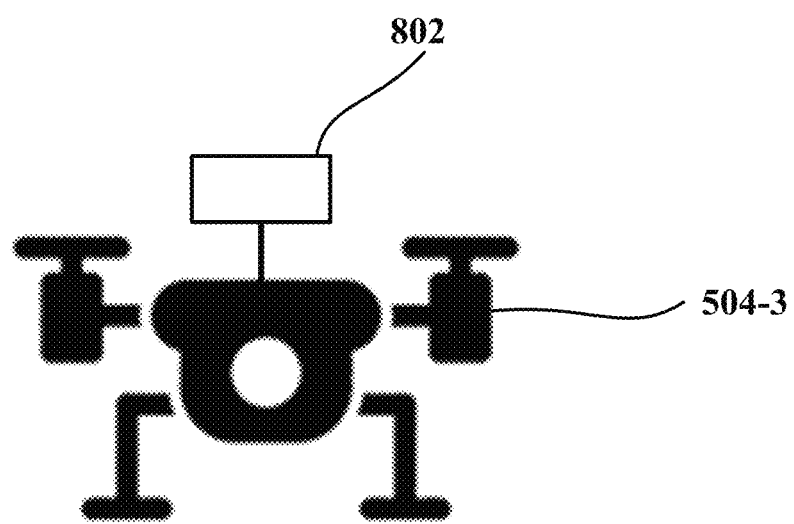
FIG. 7B shows an example of a drone on which a power system is mounted, in accordance with one embodiment.

FIG. 7A is a schematic diagram that illustrates an in-flight power generation, distribution, and storage system 802 ("power system 802") for an unmanned aircraft system (UAS or drone), in accordance with one embodiment. FIG. 7B shows an example of a drone 504-3 on which power system 802 is mounted, in accordance with one embodiment.

Power system 802 uses wind and solar power to generate electric current during the flight of the drone. As shown in FIG. 7A, power system 802 includes a miniature wind turbine 804 and a collection tube 806, both of which are mounted on the drone. In one embodiment, the collection tube 806 is mounted on the exterior of the drone at a forward location of the drone. When the drone is in flight, the collection tube 806 gathers air 810 and directs the gathered air toward the miniature wind turbine 804. The force of the air flowing through the miniature wind turbine 804 causes the wind turbine to spin and thereby generates energy.

Analog wind to digital direct current (DC) electric converter 812 converts the energy from the miniature wind turbine 804 into electricity, namely DC electricity. The DC electricity is fed to voltage regulator 822-1, which outputs a consistent DC voltage, e.g., 3.3 volts DC, 5.0 volts DC, or 12 volts DC. After passing through the voltage regulator 822-1, the DC electricity is fed through a one-way diode 814-1. The one-way diode 814-1 minimizes the risk of potentially harmful back-bias by preventing the DC electricity from flowing back toward the miniature wind turbine 804.

After passing through the one-way diode 814-1, the DC electricity is fed to power distribution panel 820 via input 820-1 of the power distribution panel. After combining the DC electricity with DC electricity from another power source, which will be explained in more detail below, the power distribution panel 820 distributes the DC electricity to battery 816 via output 820-3 of the power distribution panel and this power recharges the battery during the flight of the drone.

As shown in FIG. 7A, power system 802 also includes photovoltaic solar cells or panels 808. In one embodiment, the photovoltaic solar cells or panels 808 are mounted on the body of the drone at an appropriate location for collecting solar energy. The photovoltaic solar cells or panels 808 collect the energy from the sun's quantum rays for conversion to electric current. The energy from the photovoltaic solar cells or panels 808 is fed through a one-way diode 814-2, which prevents the energy from flowing back toward the photovoltaic solar cells or panels and thereby minimizes the risk of potentially harmful back-bias. Analog solar to digital DC electric converter 824 converts the energy from the photovoltaic solar cells or panels 808 mounted on the drone into electricity, namely DC electricity. The DC electricity is fed to voltage regulator 822-2, which outputs a consistent DC voltage, e.g., 3.3 volts DC, 5.0 volts DC, or 12 volts DC. After passing through the voltage regulator 822-2, the DC electricity is fed to power distribution panel 820 via input 820-2 of the power distribution panel. The power distribution panel 820, after combining the DC electricity from the first power input (the wind source) and the DC electricity from the second power input (the solar source) into a single combined source of DC electricity, distributes the combined DC electricity to battery 816 via output 820-3 and this power recharges the battery during the flight of the drone.

As a result of the in-flight recharging using electricity generated from wind and solar power, the battery can provide power to the drone's propulsion system and other onboard systems for a longer period of time than a battery that receives only preflight recharging. This enables a drone to have a longer flight time.

Figure 8:
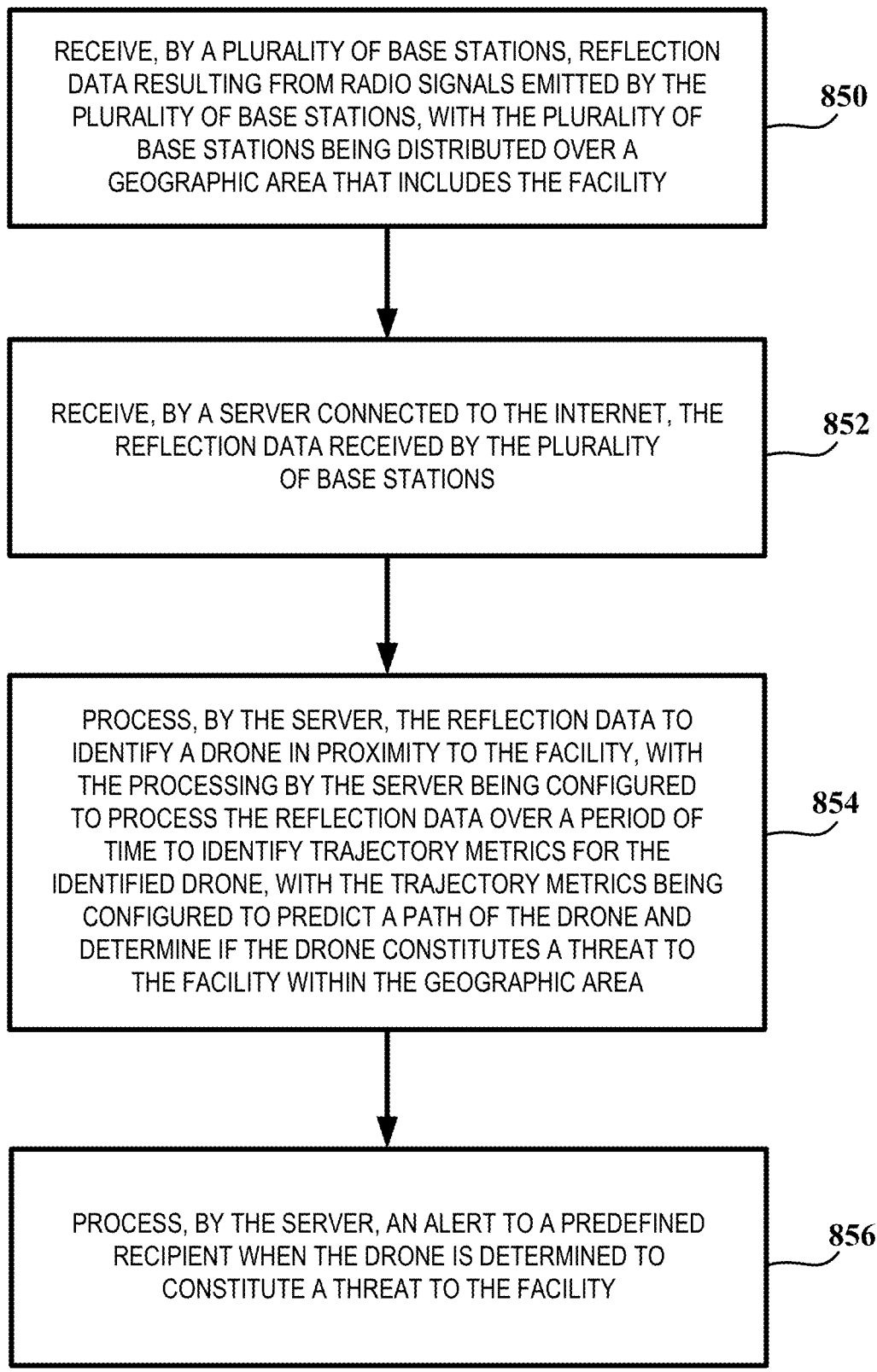
FIG. 8 is a flow diagram illustrating the method operations performed in detecting a drone in proximity to a facility, in accordance with one embodiment.

FIG. 8 is a flow diagram illustrating the method operations performed in detecting a drone in proximity to a facility, in accordance with one embodiment. In operation 850, the plurality of base stations receives reflection data resulting from the radio signals emitted by the base stations. The reflection data is generated when the radio signals emitted by the plurality of base stations reflect from an object which is contacted by the radio signals, e.g., objects

108, 110, 112, 114, and 104 shown in FIG. 1A. The plurality of base stations is distributed over a geographic area that includes the facility. By way of example, the facility can be a government building, e.g., a courthouse, a stadium, or an airport. It will be apparent to those skilled in the art that the facility can be any place or structure which could be subject to a threat by intrusion by a drone.

In operation 852, a server, which is connected to the internet, receives the reflection data received by the plurality of base stations. In one embodiment, the server is server 126 shown FIG. 1A, which server is configured to execute radar cross section (RCS) software. In operation 854, the server processes the reflection data to identify a drone in proximity to the facility. The processing by the server is configured to process the reflection data over a period of time to identify trajectory metrics for the identified drone. The trajectory metrics are configured to predict a path of the drone and determine if the drone constitutes a threat to the facility within the geographic area.

In operation 856, if it is determined that the drone constitutes a threat to the facility, the server processes an alert to a predefined recipient. In one embodiment, the predefined recipient is associated with the facility, e.g., a security director for the facility. In one embodiment, the alert is issued in the form of a digital message, e.g., a text message, an email message, or a notification posted on a website. In one embodiment, the alert conveys the presence of the drone and the real-time speed, location, and directional azimuth of the drone.

In one embodiment, the processing, by the server, to determine if the drone constitutes a threat to the facility includes analyzing the reflection data in combination with position location data of the drone. In one embodiment, the position location data of the drone includes the latitudinal, longitudinal, and altitudinal coordinates collected from the plurality of base stations.

Figure 9:
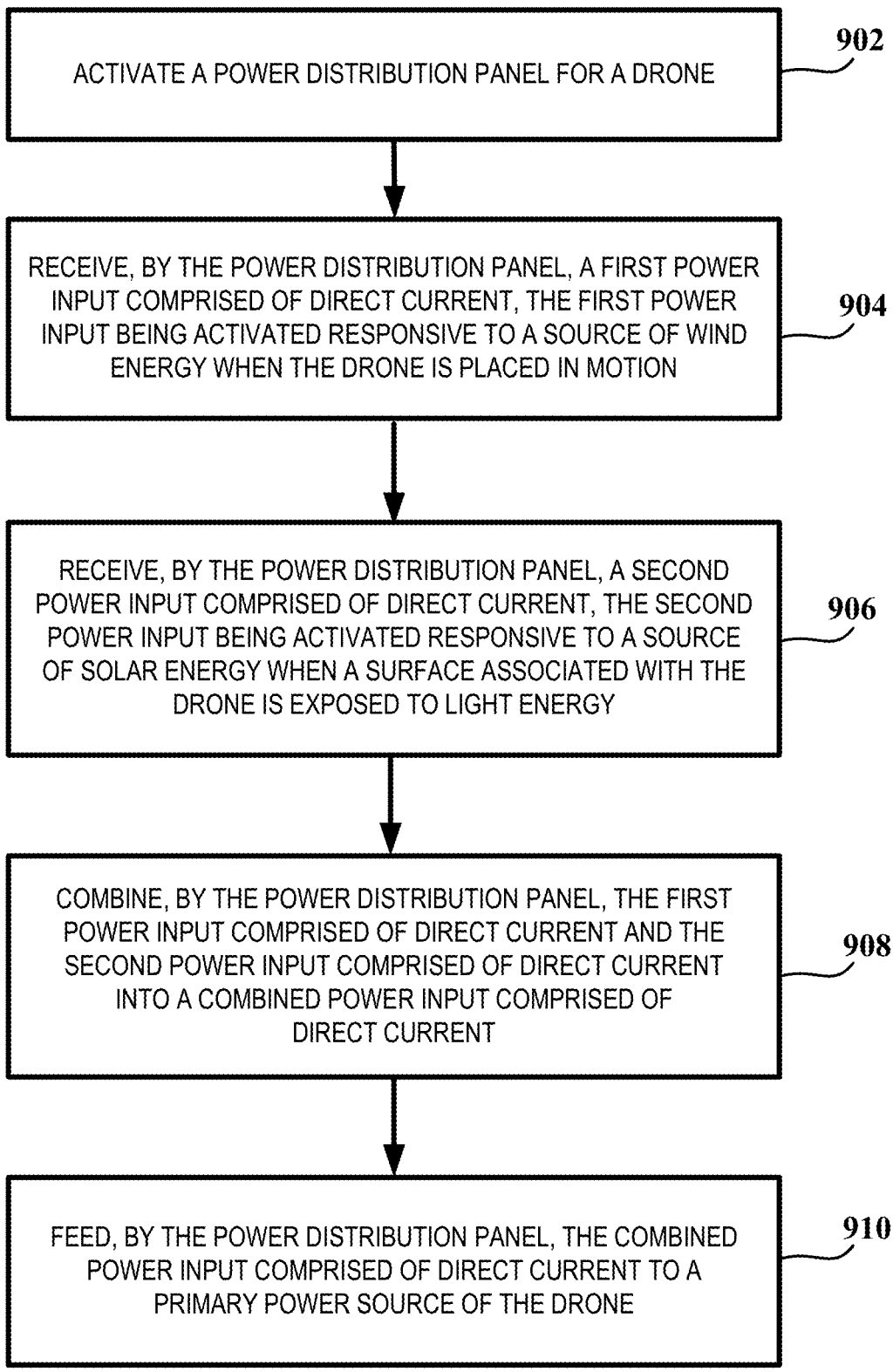
FIG. 9 is a flow diagram illustrating the method operations performed in managing power for a drone, in accordance with one embodiment.

FIG. 9 is a flow diagram illustrating the method operations performed in managing power for a drone, in accordance with one embodiment. In operation 902, a power distribution panel for a drone is activated. In one embodiment, the power distribution panel, e.g. power distribution panel 820 shown in FIG. 7A, is activated when the drone is turned on. In operation 904, the power distribution panel receives a first power input comprised of direct current. The first power input is activated responsive to a source of wind energy when the drone is place in motion, e.g., during flight of the drone. In one embodiment, the source of wind energy is a wind turbine, e.g., wind turbine 804 shown in FIG. 7A.

In operation 906, the power distribution panel receives a second power input comprised of direct current. The second power input is activated responsive to a source of solar energy when a surface associated with the drone is exposed to light energy. In one embodiment, the source of solar energy is a solar panel, e.g., solar panel 808 shown in FIG. 7A, and the surface exposed to light energy, e.g., quantum rays from the sun, is a surface of the solar panel. In operation 908, the power distribution panel combines the first power input comprised of direct current and the second power input comprised of direct current into a combined power input comprised of direct current. In operation 910, the power distribution panel feeds the single combined power input comprised of direct current to a primary power source of the drone. In one embodiment, the primary power source of the drone is a battery, e.g., battery 816 shown in FIG. 7A. In one embodiment, the single combined power input is fed to the battery via output 820-3 of the power distribution panel 820 (see FIG. 7A).

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relates to a device or an apparatus for performing these operations. The apparatus may be specially constructed for the required purpose, such as a special purpose computer, e.g., the Hardware Architecture Reference Platform (HARP). When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Accordingly, the disclosure of the example embodiments is intended to be illustrative, but not limiting, of the scope of the disclosures, which are set forth in the following claims and their equivalents. Although example embodiments of the disclosures have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. A drone detection system, comprising:
  a plurality of base stations, wherein each of the plurality of base stations is distributed over a geographic area that includes a facility to be protected, and each of the plurality of base stations is configured to emit ultra-wideband (UWB) radio signals that define an individual grid sphere, and an overall combination of the individual grid spheres defined by each of the plurality of base stations defines a drone detection UWB radio coverage area for the drone detection system, and wherein the UWB radio signals emitted by each of the plurality of base stations distributed over the geographic area are monitored for reflection data, the reflection data being generated when the UWB radio signals reflect from a flying object within the drone detection UWB radio coverage area;

a router in communication with the plurality of base stations;

a server in communication with the router, the server is configured to process the reflection data from the flying object to identify whether the flying object is a drone in proximity to the facility to be protected, and, when the flying object is identified to be a drone, the processing by the server is configured to process the reflection data over a period of time to identify trajectory metrics for the identified drone, the trajectory metrics are configured to predict a path of the identified drone and determine if the identified drone constitutes a threat to the facility to be protected within the geographic area based on the predicted path of the identified drone; and a data center connected to a network, the data center is configured to receive and store processed reflection data that has been processed by the server, wherein an alert is processed by the server when the identified drone is determined to constitute a threat to the facility to be protected.

2. The system of claim 1, wherein the plurality of base stations is connected in a mesh network that allows the plurality of base stations to communicate with each other.

3. The system of claim 1, wherein each of the plurality of base stations includes a transceiver, the transceiver emitting UWB radio signals and receiving reflected radio signals that have reflected from a flying object in the geographic area back to one of the plurality of base stations.

4. The system of claim 1, wherein the alert is sent to a predefined recipient associated with the facility to be protected.

5. A method of detecting a drone in proximity to a facility to be protected, comprising:

receiving, by a plurality of base stations distributed over a geographic area that includes the facility to be protected, reflection data resulting from ultra-wideband (UWB) radio signals emitted by the plurality of base stations, the UWB radio signals emitted by each of the plurality of base stations defining an individual grid sphere, and an overall combination of the individual grid spheres defined by each of the plurality of base stations defining a drone detection UWB radio coverage area, the reflection data being generated when the UWB radio signals reflect from a flying object within the drone detection UWB radio coverage area;

receiving, by a server connected to the internet, the reflection data received by the plurality of base stations;

processing, by the server, the reflection data to identify whether the flying object is a drone in proximity to the facility to be protected, and, when the flying object is identified to be a drone, the processing by the server is configured to process the reflection data over a period of time to identify trajectory metrics for the identified drone, the trajectory metrics are configured to predict a path of the identified drone and determine if the identified drone constitutes a threat to the facility to be protected within the geographic area based on the predicted path of the identified drone; and processing, by the server, an alert to a predefined recipient when the identified drone is determined to constitute a threat to the facility to be protected.

6. The method of claim 5, wherein the processing, by the server, to determine if the drone constitutes a threat to the facility to be protected includes analyzing the reflection data in combination with position location data of the drone, the position location data of the drone including the latitudinal, longitudinal, and altitudinal coordinates collected from the plurality of base stations.

7. The method of claim 5, wherein the alert conveys the presence of the drone and the real-time speed, location, and directional azimuth of the drone.

8. The method of claim 5, further comprising:

storing, by a data center, processed reflection data that has been processed by the server.

9. A drone detection system, comprising:

a plurality of base stations, wherein each of the plurality of base stations is distributed over a geographic area that includes a facility to be protected, and each of the plurality of base stations is configured to emit ultra-wideband (UWB) radio signals that define an individual UWB grid sphere, and an overall combination of the individual UWB grid spheres defined by each of the plurality of base stations defines a drone detection UWB radio coverage area for the drone detection system, and wherein the UWB radio signals emitted by each of the plurality of base stations distributed over the geographic area are monitored for reflection data, the reflection data being generated when the UWB radio signals reflect from a flying object within the drone detection UWB radio coverage area;

a router in communication with the plurality of base stations;

a server in communication with the router, the server is configured to process the reflection data from the flying object to identify whether the flying object is a drone that constitutes a threat to the facility to be protected, the processing of the reflection data to identify whether the flying object is a drone includes analyzing a mass size of the flying object, and, when the flying object is identified to be a drone, the processing of the reflection data to determine whether the identified drone constitutes a threat to the facility to be protected includes processing the reflection data over a period of time to identify trajectory metrics for the identified drone, the trajectory metrics are configured to predict a path of the identified drone and determine if the identified drone constitutes a threat to the facility to be protected based in part on the predicted path of the identified drone; and a data center connected to a network, the data center is configured to receive and store processed reflection data that has been processed by the server, wherein an alert is processed by the server when the identified drone is determined to constitute a threat to the facility to be protected.

10. The system of claim 9, wherein the analyzing of the mass size of the flying object to identify whether the flying object is a drone includes determining a mass size of the flying object by analyzing the UWB signals reflected back from the flying object, and comparing the determined mass size of the flying object with an assigned range of reflectivity index values.

11. The system of claim 10, wherein the flying object is determined to be a drone if the mass size of flying object is determined to correspond to a reflectivity index that falls within the assigned range of reflectivity index values for a drone.

12. The system of claim 10, wherein the flying object is determined to be a drone if the mass size of flying object is determined to correspond to a reflectivity index within the range of from 0.02 to 0.03 m$^2$.

13. The system of claim 9, wherein the identified drone is determined to constitute a threat to the facility to be protected based in part on the mass size of the identified drone and in part on a payload capability of the identified drone.

* * * * *